United States Patent [19]
Weinberg

[11] 4,066,885
[45] Jan. 3, 1978

[54] LIGHT EXTRACTOR-DIFFUSER

[76] Inventor: Norman Weinberg, 120-17 Debs Place, Bronx, N.Y. 10475

[21] Appl. No.: 699,698

[22] Filed: June 25, 1976

[51] Int. Cl.² .............................................. G03B 15/03
[52] U.S. Cl. ...................................... 362/18; 362/241
[58] Field of Search ................ 240/1.3, 41.1, 41.35 R, 240/41.35 E, 2 C; 354/126

[56] References Cited

U.S. PATENT DOCUMENTS

| 1,130,529 | 3/1915 | McGuire | 240/1.3 |
| 1,335,081 | 3/1920 | Stead | 240/41.1 |
| 2,760,048 | 8/1956 | Schulte | 240/1.3 |
| 3,140,053 | 7/1964 | Lowell | 240/1.3 |
| 3,177,354 | 4/1965 | Appleton | 240/1.3 |
| 3,747,488 | 7/1973 | Bennett | 354/126 |

Primary Examiner—William H. Beha, Jr.
Attorney, Agent, or Firm—Kirschstein, Kirschstein, Ottinger, Frank & Cobrin

[57] ABSTRACT

A light extractor-diffuser for a camera flash unit or the like. The device bounces the light off a central bilateral trapezoidal panel which is supported by two triangular shapes on its sides. The trapezoidal panel has a wide terminal portion spaced away from the triangular shapes.

14 Claims, 9 Drawing Figures

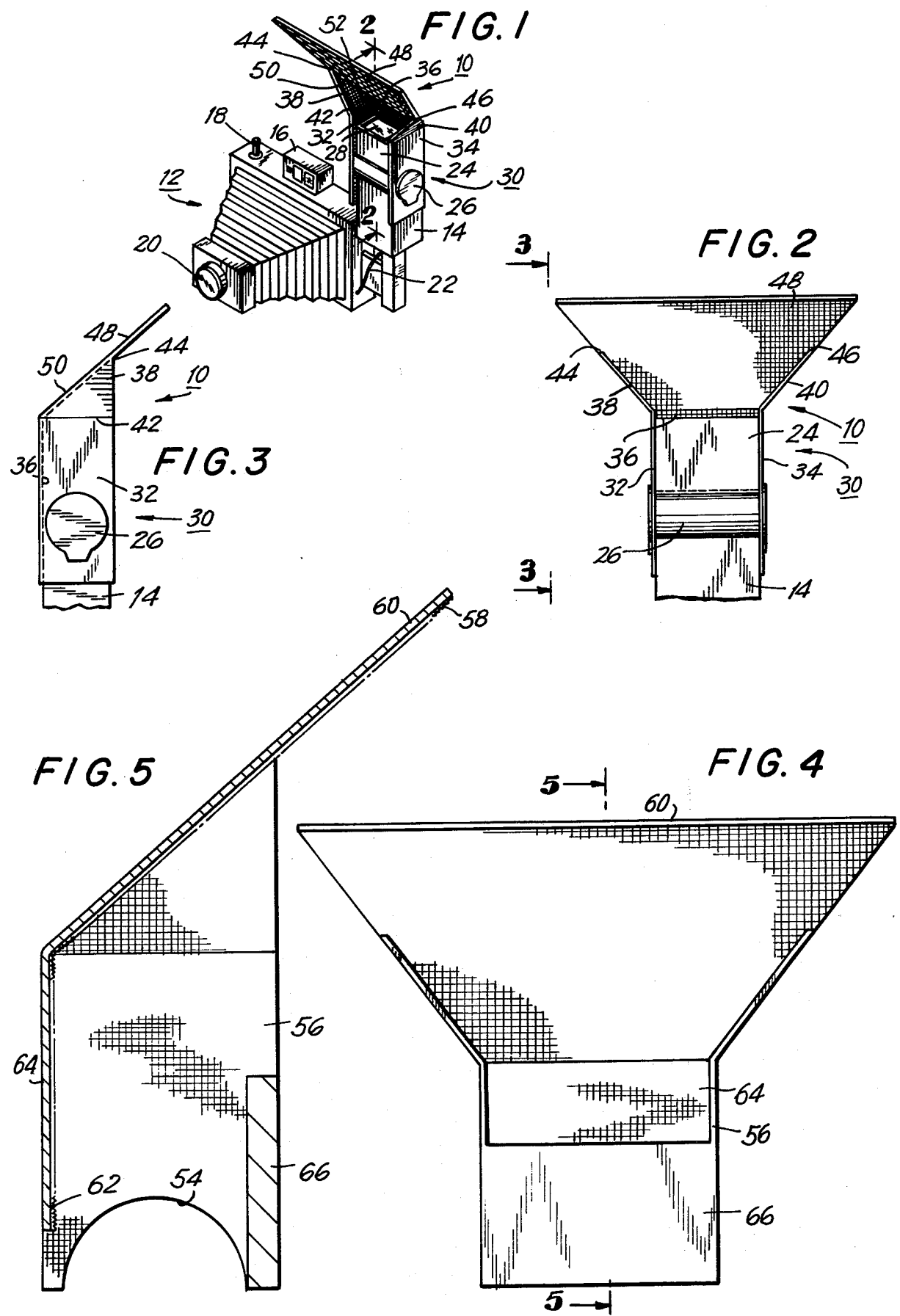

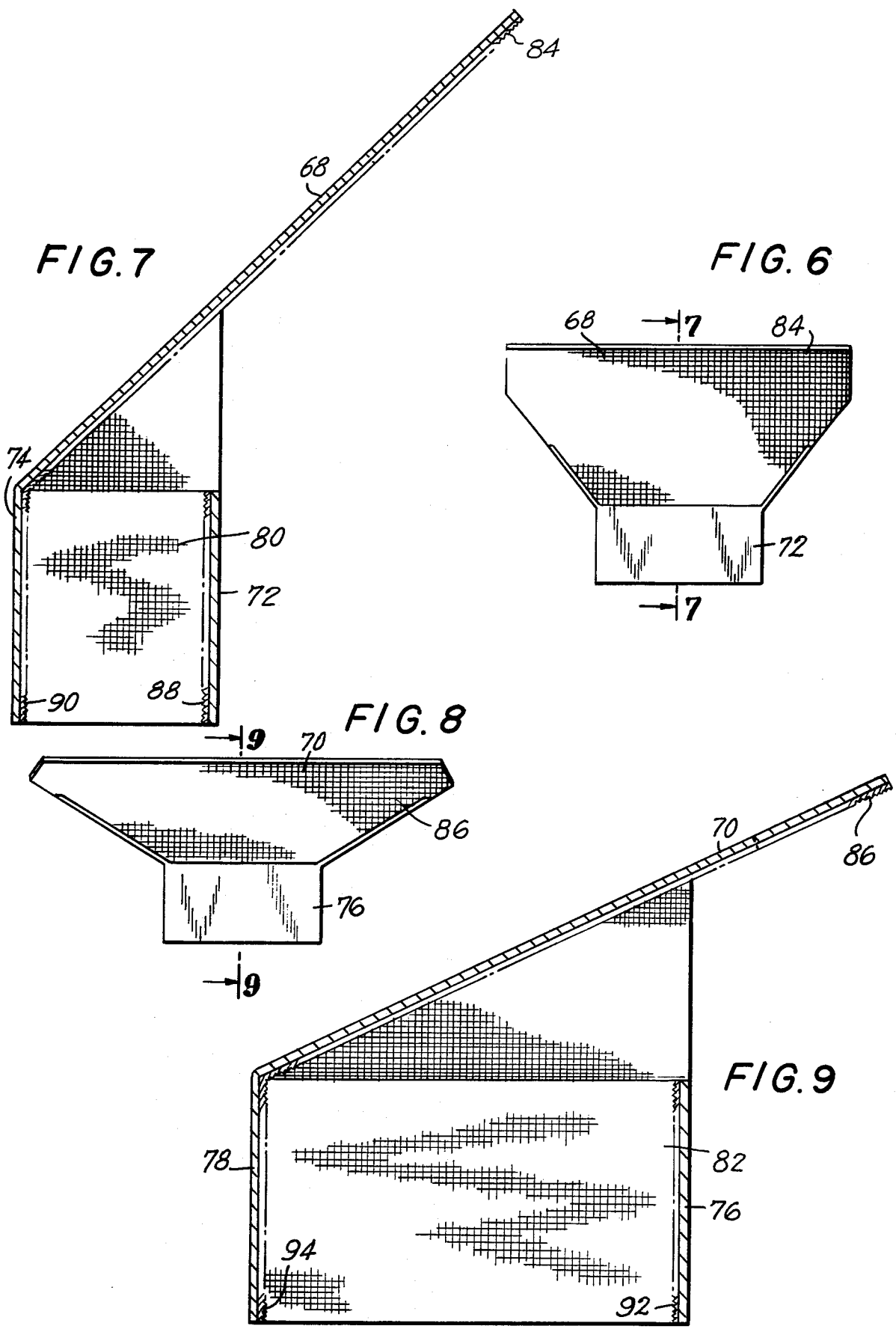

LIGHT EXTRACTOR-DIFFUSER

BACKGROUND OF THE INVENTION

1. Field of the Invention

The invention relates to a light extractor-diffuser, i.e., a bounce flash adapter.

2. Description of the Prior Art

The problem of proper illumination of a subject without glare exists in many fields in which artificial light is used. Among these field may be mentioned photography, especially flash color photography of human subjects, i.e., portrait work; motion picture photography where the source of illumination is carbon arc lights, spotlights, or floodlights; industrial and commercial photography including photo labs where originals are copied, and factory pictures for catalogues; general consumer-oriented photography with flash cameras which may employ flash units such as flash bulbs, flip flash, flash cubes, X-flash cubes, flash bars etc., or the so-called "strobe" electronic flash; duplication machinery; TV film or studio production in the television industry, especially color television; and Xerox color copying machines. In all instances the problem of attaining proper illumination, i.e., a sufficient amount of diffused light without glare or shadows, and proper illumination of details and/or colors and color shades of the subject, has not heretofore been adequately solved.

Among the many prior art devices which are directed to the proper illumination of a subject with artificial light may be mentioned those devices disclosed in U.S. Pat. Nos. 2,831,104; 2,876,338; 2,910,573; 3,258,586 and 3,728,536.

SUMMARY OF THE INVENTION

1. Purposes of the Invention

It is an object of the present invention to provide an improved light extractor-diffuser for illumination of a subject using artificial light.

Another object is to provide an improved bounce flash adapter for photography, especially for color photography such as portrait work.

A further object is to provide a light extractor-diffuser which achieves proper illumination without a glare, so that sharp detail in subject matter is attained when the subject is illuminated, especially in color photography and in Xerox color copying machines.

Still another object is to attain and retain proper color balance and retention of 100% color value in color photography, by the provision of improved illumination from an artificial light source.

An additional object is to properly diffuse light from an artificial light source, without glare, and with the prevention of light, e.g., flash light from a flash camera, from flashing or shining into the subject's eyes when a person is being photographed.

An object is to provide non-glare light and better light diffusion from an artificial light source.

An object is to improve photography, especially color photography, by providing a device which facilitates photography with better and sharper details, with a larger depth of focus.

Still another object is to properly diffuse the light from a flash source of artificial light.

Still another object is to provide a light extractor-diffuser which is economical and of low cost to manufacture.

Still a further object is to provide a light extractor-diffuser for use in photography which produces better results from inexpensive flashes and cameras.

An additional object is to provide 100% color retention in color photography.

An object is to attain greater expansion in the depth of field with limited focus cameras.

An object is to improve picture quality in terms of attaining sharp, clearly detailed pictures in photography.

These and other objects and advantages of the present invention will become evident from the description which follows.

BRIEF DESCRIPTION OF THE INVENTION

In the present invention, an improved light extractor-diffuser for the proper and improved illumination of a subject using artificial light is provided. Any source of artificial light is contemplated, e.g., flash bulbs, flash cubes, strobe electronic flash, flip flash, X-flash cubes, flash bars, carbon arc lights, floodlights, Xerox or duplication machinery lighting units, fluorescent lamps which may be linear or circular, etc. Any subject may be involved, e.g., a person whose portrait is being taken, other photography subjects such as nature scenes, e.g., flowers or animals, articles of manufacture, catalogue items, printed or written material, an existing snapshot or photograph, a work of art, an engineering drawing, etc.

The extractor-diffuser of the present invention is characterized by the provision of a frame for the mounting of the extractor-diffuser in proximity to the light source, two generally equal-sized triangular panels, and a trapezoidal panel which is generally bilateral. The frame includes two opposed spaced apart registered panels of generally equal size. Each of the triangular panels extends from an intersection with a linear edge of one of the registered panels, so that each registered panel depends from a triangular panel, i.e., a base edge of each triangular panel is attached to a linear edge of one of the registered panels. Each of the triangular panels diverges outwards from the frame at an obtuse angle relative to the registered panel, so that the linear distance between the respective apexes of the triangular panels is greater than the distance between the registered panels. The bilateral trapezoidal panel extends angularly outwards and away from the registered panels, and the narrower portion of the trapezoidal panel is attached to the triangular panels, i.e., a portion of each side edge (the non-parallel angular sides) of the trapezoidal panel, is attached to one of two opposed edges of the triangular panels, so that the wide terminal portion of the trapezoidal panel is spaced away from the intersections of the trapezoidal panel with the triangular panels, and so that the narrower of the two parallel side edges of the trapezoidal panel extends between opposed base angles of the triangular panels, which base angles are acute angles.

In service, the light extractor-diffuser receives light from an artificial light source in such a manner that the light rays move between the registered panels from the light source, in other words, the light is first extracted from the light source. The light rays thus emanating from the light source strike the surface of the trapezoidal panel, so that the light rays bounce off the trapezoidal panel and outwards towards the subject. Concomitantly, the light is diffused so that the subject is uniformly illuminated without glare.

The surface of the trapezoidal panel facing the registered panels preferably is a lenticular surface, i.e., a surface composed of a myriad of tiny generally equal-sized reflective bumps or protrusions of the nature of convex magnifiers, which aid in the uniform diffusion of the light emanating from the artificial light source. The inner surfaces of the triangular panels may also be lenticular. The lenticular surface may be attained by lamination of a lenticular sheet material to a supporting substrate.

The angle between the surface of the trapezoidal panel and the above-mentioned edge of each registered panel may be any suitable acute angle, however an angle of about 45° is preferred since the bulk of the light emanating from the artificial light source will consist of light rays traveling in a linear direction perpendicular to a plane through the above-mentioned edges of the registered panels. In this case, the light rays bouncing off the surface of the trapezoidal panel will be directed precisely at the subject, since in most instances, e.g., photography, the central axis of a camera lens or the like is oriented so as to point directly at the subject. For example, the camera may be held horizontally during picture taking by photography. The light rays from the artificial light source would travel vertically upwards, a plane through the above mentioned edges of the registered panels would be horizontal, and the plane of the trapezoidal panel would be at 45° upwards from the horizontal, so that the diffused light emanating from the extractor-diffuser would generally consist of horizontal light rays moving not only directly towards the subject but also laterally to the sides of the subject. In instances when the subject is large, e.g., in photographing a group of people, the aforementioned angle may be greater, typically on the order of 60° instead of 45°.

The registered panels of the frame may be provided with an opening or openings to accommodate for appurtenances of the artificial light source device. Typically such openings are opposed, equal sized, generally circular and in registration. For similar reasons, indentations may be provided in the registered panels, such indentations typically being in registration, with each of the indentations extending inwards from a side of a registered panel opposite to the edge of the registered panel to which the triangular panel is attached. In the case of cameras or the like having electronic strobe flash attachments which have circular end fittings or knobs, the indentations will usually be semicircular. Similar considerations apply to the preferred circular openings aspect of the registered panels configuration as mentioned supra.

Each of the registered panels will preferably be rectangular, and in most instances two registered panels will extend between the side edges of the opposed rectangular registered panels, so that the two pairs of registered panels form a rectangular parellelpiped frame structure which fits over a rectangular light source.

The terminal ends of the trapezoidal panel may be truncated, rather than of a pointed angular configuration, so as to prevent any possibility of injury to a person handling the light extractor-diffuser.

Typically the artificial light emanates from a facility or device in juxtaposition with any suitable means to photograph the subject, e.g., a snapshot camera having a flash attachment, a movie camera with adjacent floodlights, or any other sort of camera known to the art. In the case of a snapshot camera, the artificial light may emanate from any suitable flash attachment, such as a flash bulb or cube, a strobe electronic flash, or one of the other types of flash light units mentioned supra.

The present invention provides several salient advantages. The artificial light is more effectively diffused, so that, with regard to photography or the like, better and more uniform illumination of the subject is attained, without glare and/or shadows. This is especially true in the case of color photography, where the present extractor-diffuser results in the production of color pictures, e.g., portraits, which are clear with sharp detail, natural tones and shading, and retention of 100% color value. The light emanating from the artificial light source, e.g., flash light from a flash camera, is effectively prevented from flashing or shining into the subject's eyes when a person is being photographed. Thus, non-glare light and better light diffusion from an artificial light source is provided. With regard to cameras, greater expansion in the depth of field and a larger depth of focus is attained with inexpensive limited focus cameras, and with standard flash units. The invention essentially disperses and diffuses light from any point source of artificial light. In this regard, the invention is applicable to any of the fields mentioned supra in which an artificial light source is employed, and the invention is applicable to any source of artificial light. In addition, the invention obviates the normally expensive job of retouching color photographs, because of initial sharp clarity and clear detail. Finally, the present unit is inexpensive and may be cheaply mass-produced from aluminum sheet, bristol board or other paperboard, or the like.

The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the accompanying drawings in which are shown some of the various possible embodiments of the invention;

FIG. 1 is an overall perspective view of the present light extractor-diffuser mounted on the existing flash unit of a camera;

FIG. 2 is an elevation view of a portion of FIG. 1 taken substantially along the line 2—2 of FIG. 1;

FIG. 3 is a side elevation view of FIG. 2 taken substantially along the line 3—3 of FIG. 2;

FIG. 4 is an elevation view of an alternative embodiment of the invention;

FIG. 5 is a sectional elevation view of FIG. 4 taken substantially along the line 5—5 of FIG. 4;

FIG. 6 is an elevation view of another alternative embodiment of the invention;

FIG. 7 is a sectional elevation view of FIG. 6 taken substantially along the line 7—7 of FIG. 6;

FIG. 8 is an elevation view of still another alternative embodiment of the invention; and FIG. 9 is a sectional view of FIG. 8 taken substantially along the line 9—9 of FIG. 8.

DETAILED DESCRIPTION OF THE PREFERRED EMBODIMENTS

Referring now to FIGS. 1, 2 and 3, a light extractor-diffuser 10 is shown mounted on a camera 12. The camera 12 is provided with a flash unit 14, and the extractor-diffuser 10 is fitted over the upper portion of the flash unit 14. The camera 12 is provided with the usual camera appurtenances, e.g., viewer or slight element 16, button or switch 18, and lens 20. The camera 12 and the flash unit 14, per se, are of conventional design and configuration as may be found in any retail camera store. Thus, an electric cord 22 extends between electrical connection with the button 18 and the circuitry including batteries of flash unit 14.

When the button 18 is depressed, the inner closed shutter of the camera 12 opens momentarily, film within the camera 12 is exposed to light received through lens 20, and a photograph is made, which may either be a negative or a positive depending on the type of camera, as is known to those skilled in the art. Concomitantly, depression of the button 18 closes an electrical circuit through cord 22 to flash unit 14, and a momentarily flash of light emanates from flash unit 14, in order to illuminate the subject being photographed. As shown, flash unit 14 is vertically oriented, with upper portion 24 of unit 14 having been pivoted about the horizontal axis of swivel joint 26 so that portion 24 points vertically upwards, and the flash light is discharged vertically upwards from unit 14 via a top outlet 28.

As best shown in FIGS. 2 and 3, the light extractor-diffuser 10 includes a lower frame 30 which is sized to permit unit 10 to be mounted on the flash unit 14. The frame 30 includes two opposed spaced apart registered rectangular panels 32 and 34 which are of generally equal size. The two parallel panels 32 and 34 are each provided with an opening to accommodate an end of the horizontal joint 26 of flash unit 14, which openings are generally circular, so that the side panels 32 and 34 fit snugly against the sides of flash unit 14, with the circular openings in panels 32 and 34 accommodating the circular ends of joint 26. A rear rectangular panel 36 is also provided in this embodiment of the invention, to provide greater structural integrity and rigidity to unit 10. The panel 36 extends between the rear side edges of panels 32 and 34.

Two triangular panels 38 and 40, of generally equal size, are provided as an integral part of the light extractor-diffuser 10. Triangular panel 38, as best shown in FIG. 3, extends upwards from intersection 42 with the upper linear horizontal edge or registered panel 32; intersection 42 entailing attachment of the base edge of panel 38 to the linear edge of panel 32. Similar considerations apply to panel 40 vis-a-vis panel 34. As shown in FIG. 2, the triangular panels 38 and 40 diverge outwards and upwards from the frame 30 at an angle, so that the linear distance between the respective apexes 44 of panel 38 and 46 of panel 40 is greater than the distance between the registered panels 32 and 34.

The light extractor-diffuser 10 is completed in its broadest embodiment by the provision of a bilateral trapezoidal panel 48, which extends angularly upwards and outwards from a lateral attachment at either side to two opposed edges of the triangular panels, e.g., intersection of 50 between panel 48 and panel 38 (see FIG. 1). Thus the trapezoidal panel 48 has a wide upper terminal portion spaced away from the intersections of panel 48 with triangular panels 38 and 40 (e.g., intersection 50), and the narrower of the two parallel edges of the trapezoidal panel 48 namely the lower edge of panel 48, extends between opposed acute-angled base angles of the triangular panels such as angle 52 (FIG. 1). As best shown in FIG. 3, the angle between the surface of the trapezoidal panel 48 and the upper edge of registered panel 32, shown in FIG. 3 as the angle between intersections 42 and 50, is about 45°. Finally, FIGS. 1 and 2 clearly show the lenticular lower surface of the trapezoidal panel 48, and FIG. 1 also shows a lenticular inner surface on triangular panel 38.

Referring now to FIGS. 4 and 5, the light extractor-diffuser in this embodiment has a lower semi-circular indentation 54 which extends inwards from the lower edge of a registered panel 56. In addition, lenticular lamination layer 58 of a bilateral trapezoidal panel 60 is shown (FIG. 5), as well as lenticular lamination layer 62 of rear panel 64. Finally, a front rectangular panel 66 is provided, which panel 66 as shown in FIG. 5 is relatively thicker than the other panels to accommodate for fitting onto a smaller artificial light source as well as to provide greater structural rigidity and integrity, especially with regard to the lower leg of panel 56 defined by an end of indentation 54.

FIGS. 6 and 7, as well as FIGS. 8 and 9, show light extractor-diffusers in which the ends of the upper terminal portions of the respective bilateral trapezoidal panels, i.e., panel 68 of FIGS. 6 and 7, and panel 70 of FIGS. 8 and 9, are truncated. FIGS. 7 and 9 show, respectively, front and rear panels 72 and 74, and 76 and 78, which are rectangular and cooperate with the respective rectangular registered panels to which they are attached, e.g., panel 80 (FIG. 7) and panel 82 (FIG. 9), to form a rectangular parallelepiped frame configuration for mounting of the extractor-diffuser on a rectangular source of artificial light. FIGS. 8 and 9 show a light extractor-diffuser which is also characterized by a relatively wider terminal portion of the trapezoidal panel 70, i.e., the panel 70 flares outwardly and laterally to a considerably greater extent than the panels 48, 60 and 68 previously described. In addition, FIG. 9 shows an embodiment in which the acute angle between the surface of the trapezoidal panel 70 and the upper edge of the registered panel 82 is less than 45°. FIGS. 7 and 9 show respective lenticular laminations 84 and 86 of, respectively, trapezoidal panels 68 and 70, as well as lenticular laminations 88 and 90 of front and rear panels 72 and 74 (FIG. 7) and lenticular laminations 92 and 94 of front and rear panels 76 and 78 (FIG. 9).

It thus will be seen that there is provided a light extractor-diffuser which achieves the various objects of the invention and which is well adapted to meet the conditions of practical use.

As various embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A light extractor-diffuser for illumination of a subject using artificial light which comprises a frame having two opposed spaced apart registered panels of substantially equal size; two triangular panels of substantially equal size, each of said triangular panels extending from intersection with a linear edge of one of said registered panels, with a base edge of each triangular panel being attached to said edge of one of said registered panels, said triangular panels diverging outwards from said frame at an angle so that the linear distance between the respective apexes of the triangular panels is greater than the distance between said registered panels, and a substantially bilateral trapezoidal panel, said trapezoidal panel extending angularly outwards from lateral attachment to two opposed edges of said triangular panels and having a wide terminal portion spaced away from the intersections of said trapezoidal panel with triangular panels, the narrower of the two parallel edges of said trapezoidal panel extending between opposed acute-angled base angles of said triangular panels.

2. The light extractor-diffuser of claim 1 in which the trapezoidal panel has a lenticular surface facing the registered panels.

3. The light extractor-diffuser of claim 1 in which the angle between the surface of the trapezoidal panel and the edge of each registered panel is about 45°.

4. The light extractor-diffuser of claim 1 in which the artificial light emanates from juxtaposition with means to photograph the subject.

5. The light extractor-diffuser of claim 4 in which the means to photograph the subject is a camera.

6. The light extractor-duffuser of claim 5 in which the artificial light emanates from a flash unit.

7. The light extractor-diffuser of claim 1 in which at least one of the two registered panels is provided with an opening.

8. The light extractor-diffuser of claim 7 in which the opening is substantially circular.

9. The light extractor-diffuser of claim 7 in which both of the registered panels are provided with an opening, the openings being in registration.

10. The light extractor-diffuser of claim 1 in which each of the two registered panels is provided with an indentation, said indentations being in registration, each of said indentations extending inwards from a side of a registered panel opposite to the edge of the registered panel to which the triangular panel is attached.

11. The light extractor-diffuser of claim 10 in which each indentation is semicircular.

12. The light extractor-diffuser of claim 1 in which each of the registered panels is rectangular.

13. The light extractor-diffuser of claim 12 in which two registered panels extend between the rectangular registered panels, each of said registered panels extending between the side edges of the opposed rectangular registered panels; so that the two pairs of registered panels form a rectangular parallelepiped frame.

14. The light extractor-diffuser of claim 1 in which the terminal ends of the trapezoidal panel are truncated.

* * * * *